Aug. 2, 1949.
D. MURDOCK
2,477,818
CABLE CONNECTOR
Filed July 10, 1944
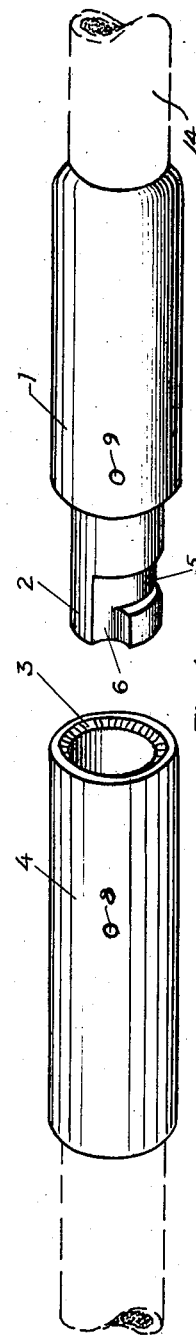
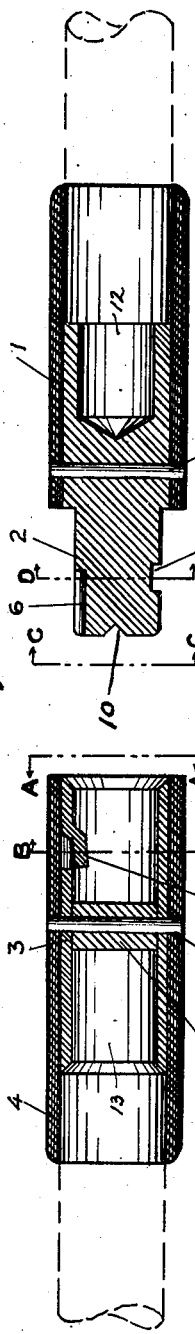
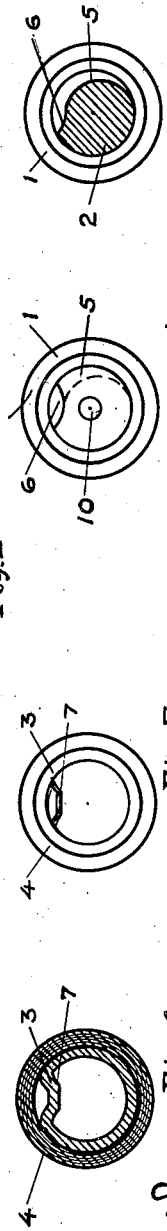
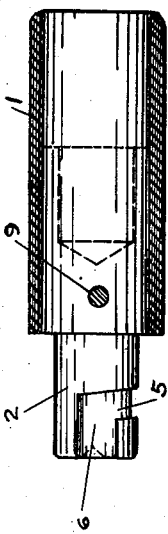
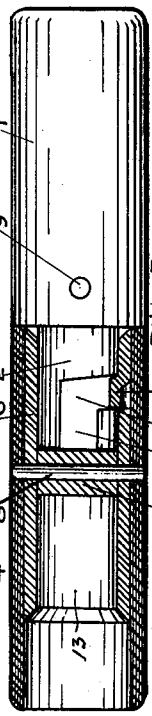
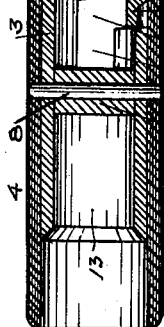
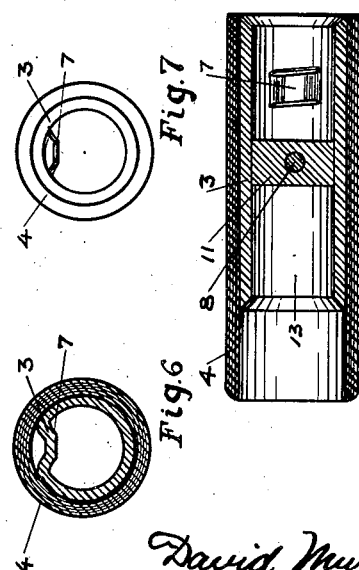
David Murdock
INVENTOR
BY Arthur Minnick
ATTORNEY Patented Aug. 2, 1949

2,477,818

UNITED STATES PATENT OFFICE 2,477,818

CABLE CONNECTOR

David Murdock, Tampa, Fla.

Application July 10, 1944, Serial No. 544,269

5 Claims. (Cl. 287—119)

This invention relates to couplings which are especially adapted for connecting sections of heavy cables of the kind used in electric arc welding.

In an industry such as modern shipbuilding, welding cables are frequently subject to severe usage as they are pulled along steel surfaces and around corners, and their connectors must be rugged to withstand abuse. Efficient insulation is imperative and where many cable sections are supplied for use, couplings must be interchangeable so that any two sections may be joined readily with satisfactory electrical contacts suitable for carrying the heavy currents used in welding. The connections must be secure to prevent accidental pulling apart when the cables are placed under tension and to prevent separation because of vibration, yet the engagement and disengagement of the coupling members should be easily effected.

The primary object of the present invention is to provide a simple and efficient device which will form a positive vibration-proof connection for welding cables. A further object of the invention is to provide good electrical contact between the members without the use of springs or slotting of the parts and another object is to provide a form of insulation which will permit easy attachment of the couplings to the cables and leave no exposed metal. Other objects and advantages of the invention will appear in the description of a preferred form of the device illustrated in the accompanying drawings, in which Figure 1 is a side view as seen at an angle, of the two members of a coupling in position for engagement; Fig. 2 is a cross section longitudinally of the members, taken in a plane at right angles to Fig. 1; Fig. 3 is a longitudinal section through the socket member taken at right angles to Fig. 2 and looking toward the top in that figure; Fig. 4 is a side elevation of the plug member with the insulating sleeve in section; Fig. 5 is a view of the two members in the locked position, the plug member being in elevation and the socket member in section; Fig. 6 is a transverse section in the plane indicated by the line B—B of Fig. 2; Fig. 7 is an end elevation of the socket member as seen from A—A of Fig. 2; Fig. 8 is an end elevation of the plug member as seen from C—C of Fig. 2; and Fig. 9 is a transverse section looking to the right from the plane indicated by the line D—D of Fig. 2.

A sleeve 1 serves as an insulating cover for one end of a metallic plug member 2 of substantially cylindrical section within the cover and having a reduced cylindrical outer end for engagement within one end of a socket member 3 which is provided with an insulating cover 4 which is longer than the member 3.

A cam groove 5 in the reduced end of the plug member 2 has its bottom formed in a curve eccentric to the axis of the plug member and at its deepest portion, the groove 5 is connected with a guide groove 6 set longitudinally of the surface of the plug. The member 3 is preferably made of a short length of metallic tubing having a cam boss 7 formed in its wall by punching inward a small portion of the metal lying between a diagonal slit in the wall and the open end of the tube. This elastic boss is of a size such that it can slide lengthwise of the groove 6 and of the groove 5. Its diagonally directed inner edge is of the same inclination as that of the outer wall of the cam groove 5.

A barrier plug 11 is seated with a pressed fit at about the center of the tubular member 3 for engagement with the smooth outer end of the plug member 2. A small cavity 10 may be formed by a drill at the axis of the member 2 while it is being finished in a lathe, thus eliminating any burr that might be left in cutting the end face of the plug.

The member 2 can be slid longitudinally into the socket member 3 to engage the plug 11 only when the boss 7 is in registration with the groove 6, and the distance of the inner edge of the boss from the adjacent face of the plug 11 is such that when the end of the member 2 comes into contact with the face of the plug 7, the boss will lie opposite the cam groove 5 which it can be made to enter by rotating one member with respect to the other. The cam surfaces of the boss and of the groove act to force the smooth end face of the plug 2 into tight engagement with the plug 11 and at about one-third of a turn, the pressure of the face of the boss 7 upon the bottom of the groove 5 will be sufficient to make further rotation difficult. Since the cam surface of the bottom of the slot 5 is eccentric to the axis of the plug, contact of the boss with this cam surface will exert a radial thrust on the tubular member which will cause its inner wall to be pressed into still closer contact with the outer surface of the plug member 2.

The purpose of the coupling being to provide a perfect electrical connection between the two cable sections of which the plug and socket members form ends, it will be understood that all plug members will be machined to the same outer dimensions and that the socket members will also all have the same interior dimensions so that any plug may be slid into any socket with only such necessary clearance as will enable ready engagement of the two members by the use of moderate pressures.

While the primary sliding engagement will afford good electrical contacts, tension or vibration might cause unintentional separation of the coupling members if it were not for the engagement of the boss with the cam slot, which of course prevents any longitudinal movement, while the elasticity of the boss maintains sufficient friction to prevent rotation until a quick, sudden twist is exerted to start the movement of the boss out of the slot.

It will be understood that the front wall of the groove 5 is substantially a section of a spiral surface acting on the boss 7 to exert a longitudinal tension pressing the smooth outer end of the plug into close contact with the bottom of the socket formed by the plug 11, while the eccentric curve of the bottom of the cam groove diminishing in depth away from the guide groove causes engagement of the free surface or top of the boss against the spiral wedge to exert a radial thrust which will clamp the resilient tube forming the member 3 against the plug surface.

The manner of attaching the cables to the terminals forms no part of the present invention, but the usual soldering socket 12 is shown in Fig. 2 as formed in the end of the member 2 remote from the slots 5 and 6, and the chamber 13 shown at the left of the plug 11 in Fig. 2 is also adapted for use as a soldering socket for the end of the other cable. A short length of insulation is removed from each cable end to expose the metallic core, and before the coupling members are attached, the insulating sleeves 1 and 4 are slid onto the cables far enough to avoid interference with the soldering or welding of the cable ends within the sockets 12 and 13.

After the cables are secured to the coupling members, the sleeves 1 and 4 are slid down over the members and secured thereto by fiber or plastic pins 8 and 9, the exposed ends of which at the surfaces of the sleeves will not form a conductor for current. The inner ends of both sleeves extend for a suitable distance over the insulation 14 of the cables to prevent any exposure of the rear ends of the connector members, and their outer ends are so set that they are very close to each other when the end of the plug member engages the plug 11.

It will be evident that many changes may be made in the form, proportions, and details of arrangements of the parts without departure from the invention as claimed.

I claim:
1. A connector for electric cables comprising a tubular socket member having a transverse contact surface and having a boss extending radially inward, and a plug member provided with a longitudinally extending guide groove in its outer surface to receive the boss and to permit longitudinal movement of the plug member into the socket member, the plug member being also provided with a cam groove connected with the guide groove and adapted for engagement with one side of the boss to move the end of the plug into engagement with the transverse contact surface of the socket member.

2. A connector for electric cables comprising a member formed with a socket in one end and having a resilient boss extending into one side of the socket, and a plug member having a groove formed in its outer surface, the groove having a portion diminishing in depth spirally of the plug, whereby the plug may be inserted into the socket and whereby partial rotation of one member with the boss in the spiral portion of the groove and in contact with surfaces thereof will cause longitudinal and radial movement of the plug member within the socket to bring the members into closer contact.

3. A connector for electric cables comprising a socket member provided with a substantially cylindrical socket having a transverse contact surface at its inner end and having a resilient boss extending radially inward, and a substantially cylindrical plug member provided with a longitudinally extending guide groove in its outer surface to receive the boss and to permit longitudinal movement of the plug member into the socket member until the end of the plug member comes into contact with the transverse contact surface of the socket, the plug member having a cam groove connected with the guide groove permitting relative rotation of the plug and socket members, the cam groove being adapted for engagement with the resilient boss to hold the end of the plug and the inner end of the socket in tight contact.

4. A structure as in claim 3 in which the surface of the bottom of the cam groove is eccentric to the axis of the plug, whereby contact of the boss with the eccentric surface of the groove will exert a radial pressure to force the plug sidewise against the wall of the socket member and will maintain friction to hinder rotation of the plug in the socket.

5. A connector for electric cables comprising a socket member having a portion thereof formed of a metallic tube to provide a substantially cylindrical socket having a transverse contact surface, the wall of the tube having a resilient portion struck inward to form a boss, and a substantially cylindrical plug member slidable longitudinally of the socket, the plug member having a longitudinally extending guide groove in its surface permitting passage of the boss until the end of the plug engages the transverse contact surface, and having a cam groove connecting with the guide groove to receive the boss, permitting relative rotation of the plug and socket members with the resilient boss engaging the cam groove to exert radial pressure to cause the inner wall of the socket to be pressed into closer contact with the outer surface of the plug.

DAVID MURDOCK.

REFERENCES CITED

The following references are of record in the file of this patent:

UNITED STATES PATENTS

| Number | Name | Date |
|---|---|---|
| 279,267 | Nock | June 13, 1883 |
| 965,131 | Bliss | July 19, 1910 |
| 1,413,280 | Kengel | Apr. 18, 1922 |

FOREIGN PATENTS

| Number | Country | Date |
|---|---|---|
| 45,310 | Austria | Dec. 10, 1910 |
| 175,887 | Great Britain | Mar. 2, 1922 |